United States Patent
Bent et al.

(10) Patent No.: US 9,916,311 B1
(45) Date of Patent: Mar. 13, 2018

(54) STORAGE OF BURSTY DATA USING MULTIPLE STORAGE TIERS WITH HETEROGENEOUS DEVICE STORAGE

(71) Applicant: EMC Corporation, Hopkinton, MA (US)

(72) Inventors: John M. Bent, Los Alamos, NM (US); Sorin Faibish, Newton, MA (US); Uday Gupta, Westford, MA (US); Percy Tzelnic, Concord, MA (US)

(73) Assignee: EMC Corporation, Hopkinton, MA (US)

( * ) Notice: Subject to any disclaimer, the term of this patent is extended or adjusted under 35 U.S.C. 154(b) by 257 days.

(21) Appl. No.: 14/143,728

(22) Filed: Dec. 30, 2013

(51) Int. Cl.
*G06F 17/30* (2006.01)

(52) U.S. Cl.
CPC .. *G06F 17/30091* (2013.01); *G06F 17/30218* (2013.01)

(58) Field of Classification Search
CPC ......... G06F 17/30218; G06F 17/30091; G06F 11/1435
See application file for complete search history.

(56) References Cited

U.S. PATENT DOCUMENTS

| | | | | |
|---|---|---|---|---|
| 2011/0082988 A1* | 4/2011 | Kono | ..................... | G06F 3/0605 711/161 |
| 2011/0246491 A1* | 10/2011 | Clash | ..................... | G06F 17/302 707/755 |
| 2012/0246403 A1* | 9/2012 | McHale | ................ | G06F 3/0604 711/114 |
| 2012/0254508 A1* | 10/2012 | Walls | .................. | G06F 11/2087 711/103 |
| 2012/0254565 A1* | 10/2012 | Mitra | .................. | G06F 11/1435 711/161 |
| 2013/0227194 A1 | 8/2013 | Kannan et al. | | |
| 2014/0245077 A1* | 8/2014 | Kanso | ................ | G06F 11/1482 714/47.3 |
| 2014/0351300 A1* | 11/2014 | Uppu | .................. | H04L 12/6418 707/827 |
| 2015/0134780 A1* | 5/2015 | Weber | ............... | G06F 15/17306 709/219 |

* cited by examiner

*Primary Examiner* — Alexander Khong
(74) *Attorney, Agent, or Firm* — Ryan, Mason & Lewis, LLP (57) ABSTRACT

Improved techniques are provided for storing bursty data, such as checkpoints, in parallel computing environments. A parallel file system is provided comprising at least first and second storage tiers comprising respective disjoint subsets of storage; and at least one processing device configured to store burst data from a plurality of distributed processes for a given burst operation during the given burst operation on both of the at least first and second storage tiers. The given burst operation comprises a multi-phase input/output (IO) task, such as a checkpoint, having alternating periods of idle time and bursts of write and/or storage activity. A method is also provided for provisioning a parallel file system by obtaining a specification of burst data requirements for the parallel file system and determining an amount of storage required for at least first and second storage tiers comprising respective disjoint subsets of storage to satisfy the burst data requirements.

19 Claims, 9 Drawing Sheets

```
#!/usr/bin/env python
import sys,re,os,optparse
class Tier(object):
    def_init_(self,capacity,cap_cost,bw,bw_cost):
        self.capacity = capacity
        self.cap_cost= cap_cost
        self.bw= bw
        self.bw_cost = bw_cost
settings = {
    'Ckpt Sz (TB)'    : {'def' : 5120, 'name': 'ckpt_sz' },
    'Ckpt Latency (s)': {'def' : 300, 'name': 'ckpt_lat' },
    'Ckpt Interval (s)': {'def : 3600, 'name': 'ckpt_int' },
    'SSD $/GB'        : {'def' : 1, 'name' : 'ssd_cost_per_gb'},
    'SSD $/GB/s'      : {'def' : 1000, 'name': 'ssd_cost_per_gbps'},
    'Ckpts in SSD'    : {'def' : 3, 'name' : 'ssd_capacity' },
    'Disk $/GB'       : {'def' : 0.029, 'name' : 'disk_cost_per_gb' },
    'Disk $/GB/s'     : {'def' : 2194, 'name': 'disk_cost_per_gbps'},
    'Ckpts in Disk'   : {'def' : 30, 'name': 'disk_capacity' },
} def setParser(parser):
        short = 'A'
        for (k, v) in sorted(settings.items()):
            v['short'] = '-%c' % short
            short = chr(ord(short) + 1)
            parser.add_option(v['short'], '--%s' %v['name'], type='float',
                    metavar='<ARG>', help= '%s [%%default]' % k, default=v['def'])
```

FIG. 5B

```
def compute_costs(ckpt_sz,ckpt_stored,ckpt_time,capacity_cost,bw_cost):
    ckpt_sz *= 1024 # convert to GB
    cap_required = ckpt_sz * ckpt_stored
    bw_required = ckpt_sz / float(ckpt_time)
    cap_cost = cap_required * capacity_cost
    bw_cost = bw_required * bw_cost
    tier = Tier(cap_required,cap_cost,bw_required,bw_cost)
    return tier def printRow(type,cap,cap_cost,bw,bw_cost):
    def printSingleRow(device,type,units,sum,cost):
        print "%5s %8s %10.2f %6s : $%5.2fM" %\
            (device, type, sum, units, cost/1000000)
    printSingleRow(type,"Capacity","PB",cap/(1024*1024),cap_cost)
    printSingleRow("","BW", "TB/s",bw/1024,bw_cost)

def printResults(Type, disk, ssd):
    # let's figure out the total and then output the calculations
    ssd_cost = max(ssd.cap_cost,ssd.bw_cost) / 1000000
    disk_cost = max(disk.cap_cost,disk.bw_cost) / 1000000
    print "############## %s ###########" %Type
    printRow("SSD",ssd.capacity, ssd.cap_cost, ssd.bw, ssd.bw_cost)
    printRow("Disk", disk.capacity, disk.cap_cost, disk.bw, disk.bw_cost)
    print "---------"
    print "TOTAL $%.2fM ($%.2fM SSD + $%.2fM disk)\n" %\
        (ssd_cost+disk_cost,ssd_cost,disk_cost)
```

*FIG. 5C*

```
def main( ):
    parser = optparse.OptionParser()
    setParser(parser)
    (options, args) = parser.parse_args()
    # print the settings (with -flag) and then the output
    for k,v in sorted(settings.items()):
            print "# %25s (%s) : %9.2f" % (k,v['short'],options.__dict__[v['name']])
    print ""

########################### ~ 555
    # first disk_only approach
    ssd =Tier(0,0,0,0)
    disk = compute_costs(
            options.ckpt_sz, options.disk_capacity, options.ckpt_lat,
            options.disk_cost_per_gb, options.disk_cost_per_gbps)
    printResults("Disk Only",disk,ssd)

########################### ~ 560
    # ssd_only disk = Tier(0,0,0,0)
    ssd = compute_costs(
            options.ckpt_sz, options.disk_capacity, options.ckpt_lat,
            options.ssd_cost_per_gb, options.ssd_cost_per_gbps)
    printResults("SSD Only",disk,ssd)

########################### ~ 565
    # now the flash-bw, disk-capacity approach
    # the disk needs to hold a bunch and needs bandwidth for
    # the checkpoint interval
    disk = compute_costs(
    options.ckpt_sz, options.disk_capacity, options.ckpt_int,
    options.disk_cost_per_gb, options.disk_cost_per_gbps)
    # the ssd needs to checkpoint really fast and needs less capacity
    ssd = compute_costs(
            options.ckpt_sz, options.ssd_capacity, options.ckpt_lat,
            options.ssd_cost_per_gb, options.ssd_cost_per_gbps)
    printResults("Fully Tiered" ,disk,ssd)
```

*FIG. 5D*

```
###############################
# now hybrid tiers
# disk is the same as above
# the ssd tier is almost the same but needs less bandwidth since
some data going to disk tier disk_cost = max(disk.bw_cost,disk.cap_cost)
disk_avail_bw = disk_cost / float(options.disk_cost_per_gbps) /1024 disk_data = disk_avail_bw * options.ckpt_lat
ssd = compute_costs(
        options.ckpt_sz - disk_data, options.ssd_capacity, options.ckpt_lat,
        options.ssd_cost_per_gb, options.ssd_cost_per_gbps)
printResults("Cooperatively Tiered",disk,ssd)

main()
```

FIG. 6

```
#      Ckpt Interval (s) (-A) :        3600.00
#      Ckpt Latency (s) (-B) :         300.00
#      Ckpt Sz (TB) (-C) :             5120.00
#      Ckpts in Disk (-D) :            30.00
#      Ckpts in SSD (-E) :             3.00
#      Disk $/GB (-F) :                0.03
#      Disk $/GB/s (-G) :              2194.00
#      SSD $/GB(-H) :                  1.00
#      SSD $/GB/s (-I) :               1000.00

######## Disk Only ############ ——— 610
SSD Capacity    0.00        PB :   $  0.00M
BW              0.00        TB/s:  $  0.00M
Disk Capacity   150.00      PB :   $  4.56M
BW              17.07       TB/s:  $38.34M
----------
TOTAL $38.34M ($0.00M SSD + $38.34M disk)

######## SSD Only ############ ——— 620
SSD Capacity    150.00      PB :   $157.00M
BW              17.07       TB/s:  $17.48M
Disk Capacity   0.00        PB :   $  0.00M
BW              0.00        TB/s:  $  0.00M
----------
TOTAL $157.00M ($157.00M SSD + $0.00M disk)

######## Fully Tiered ############ ——— 630
SSD Capacity    15.00       PB :   $ 15.00M
BW              17.07       TB/s:  $ 17.48M
Disk Capacity   150.00      PB :   $  4.56M
BW              1.42        TB/s:  $  3.20M
----------
TOTAL $22.04M ($17.48M SSD + $4.56M disk)

######## Cooperatively Tiered ############ ——— 640
SSD Capacity    13.22       PB :   $ 13.86M
BW              15.04       TB/s:  $ 15.40M
Disk Capacity   150.00      PB :   $  4.56M
BW              1.42        TB/s : $  3.20M
TOTAL $19.96M ($15.40M SSD + $4.56M disk)
```

STORAGE OF BURSTY DATA USING MULTIPLE STORAGE TIERS WITH HETEROGENEOUS DEVICE STORAGE

FIELD

The invention relates generally to data storage, and more particularly to storage of bursty data, such as checkpoints in parallel file systems.

BACKGROUND

Parallel storage systems are widely used in many computing environments. Parallel storage systems provide high degrees of concurrency in which many distributed processes within a parallel application simultaneously access a shared file namespace. Parallel computing techniques are used in many industries and applications for implementing computationally intensive models or simulations.

In many parallel computing applications, a group of distributed processes typically protect themselves against failure using checkpoints. Checkpointing is an extremely difficult workload for the storage system since each application simultaneously writes data to the storage system. Checkpoints thus create a bursty period of input/output (IO) in which the storage system is mostly idle except for infrequent periods of IO in which the bandwidth of the entire storage system is saturated and the expensive distributed processes in compute nodes are idle. Checkpoints often result in wasted resources since the storage system must be extremely powerful while remaining substantially idle between checkpoint phases.

It is desirable for storage systems to provide a minimum amount of capacity to store the required checkpoint data while also requiring a minimum amount of bandwidth to perform each checkpoint operation quickly enough so that the expensive processors in the compute nodes are not idle for excessive periods of time. A need therefore exists for improved checkpointing techniques in parallel computing environments.

SUMMARY

Illustrative embodiments of the present invention provide improved techniques for storing bursty data, such as checkpoints, in parallel computing environments. In one embodiment, a parallel file system is provided comprising at least first and second storage tiers comprising respective disjoint subsets of storage; and at least one processing device configured to store burst data from a plurality of distributed processes for a given burst operation during the given burst operation on both of the at least first and second storage tiers. The given burst operation comprises a multi-phase input/output (IO) task, such as a checkpoint, having alternating periods of idle time and bursts of write and/or storage activity.

According to another aspect of the invention, a method is provided for provisioning a parallel file system by obtaining a specification of burst data requirements for the parallel file system; and determining an amount of storage required for at least first and second storage tiers comprising respective disjoint subsets of storage to satisfy the burst data requirements such that the at least first and second storage tiers can store burst data from a plurality of distributed processes for a given burst operation during the given burst operation.

As noted above, illustrative embodiments described herein provide significant improvements relative to conventional checkpointing arrangements. In some of these embodiments, use of multiple storage tiers, such as flash and disk storage, to perform a checkpoint or other burst operation provides a better balance between the relative costs of memory and disk and their relative speeds than would otherwise be possible.

DETAILED DESCRIPTION

Illustrative embodiments of the present invention will be described herein with reference to the storage of bursty data in exemplary parallel file systems and associated clients, servers, storage arrays and other processing devices. It is to be appreciated, however, that the invention is not restricted to use with the particular illustrative parallel file system and device configurations shown. Accordingly, the term "parallel file system" as used herein is intended to be broadly construed, so as to encompass, for example, distributed file systems and other types of file systems implemented using one or more processing devices. While the invention is illustrated herein primarily in the context of the storage of checkpoint data, the present invention can be applied to the storage of any bursty data, as would be apparent to a person of ordinary skill in the art. As used herein, bursty data comprises any multi-phase input/output (IO) task with alternating periods of idle time and bursts of write and/or storage activity.

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices.

As previously indicated, one aspect of the invention employs multiple storage tiers, such as flash and disk storage, to perform a checkpoint operation to thereby provide a better balance between the relative costs of memory and disk and their relative speeds than would otherwise be possible. Typically, the target efficiency of the distributed processors is 90%, which requires sufficient bandwidth that checkpointing latency is no more than 10% of the checkpoint interval. For many years, the number of disks required to provide the minimum capacity provided sufficient bandwidth to achieve the target 90% efficiency of the compute nodes. This allowed HPC systems to buy storage based on a capacity that exceeded the required bandwidth. However, over time, capacity growth in disks has exceeded performance growth. Therefore, HPC has now entered an era in which storage must be purchased to satisfy the bandwidth requirement. Buying disks to satisfy the required bandwidth, however, is prohibitively expensive.

It is anticipated that a disk-based bandwidth system would require a storage budget exceeding 40% of the total cost of the supercomputer, whereas the budget allocated for storage is typically set at a maximum of 20% of the total cost of the supercomputer. Flash storage is approximately twice as inexpensive for dollars per gigabyte per second for sequential IO. Of course, flash storage cannot be purchased for capacity. Thus, future HPC systems are being designed with a small flash tier for bandwidth called a "burst buffer" and a large disk tier for storage. For example, a supercomputer currently being designed by the Department of Energy requires a checkpoint bandwidth of 3.8 TB/s. Most solutions being devised are building a flash tier that can provide the full 3.8 TB/s of bandwidth. The checkpoints will be initially stored on the flash tier. Once the compute nodes have completed the checkpoint, the flash tier will be migrated to the larger disk tier, before the compute nodes need to checkpoint again. The projections are that the disk tier must therefore be able to provide 700 GB/s of bandwidth.

The full aggregate bandwidth of such a system is thus 4.5 TB/s when summing the 3.8 TB/s of the flash tier with the 700 GB/s of the disk tier. Aspects of the present invention recognize that the disk tier remains fully idle during the checkpoint. Thus, one aspect of the invention provides a bandwidth maximizing burst buffer storage system that uses the full aggregate bandwidth of the storage system. In this manner, the exemplary 3.8 TB/s bandwidth requirement of the flash tier is reduced to 3.1 TB/s by using the 700 GB/s bandwidth of the disk tier during checkpoints. This will reduce the cost of the burst buffer flash tier by approximately 20%.

According to one aspect of the invention, during a checkpoint, the checkpoint data is directed to both the flash tier and the disk tier such that the required checkpoint capacity is achieved. For example, a target checkpoint capacity of 3.8 TB/s can be achieved by sending 3.1 TB/s of checkpoint data to the flash tier and 700 GB/s of checkpoint data to the disk tier. Once the checkpoint completes, the data is then migrated from the flash tier to the disk tier. In this manner, a more efficient checkpoint system is achieved by utilizing additional storage resources both during the checkpoint and the migration phase.

While the present invention is illustrated herein using multiple storage tiers comprised of flash storage and disk storage, other storage technologies can be employed in each tier, as would be apparent to a person of ordinary skill in the art. In addition, while the present invention is illustrated herein using multiple storage tiers to store a checkpoint, as noted above, the present invention also applies to other bursty IO tasks, as would be apparent to a person of ordinary skill in the art.

Consider an exemplary storage system with a desired bandwidth capacity of 2.7 TB/s and a desired storage capacity of 120 PB of data. The exemplary storage system can be implemented, for example, using 38,000 4 TB drives to achieve the desired 2.7 TB/s of bandwidth. This solution, however, is rather expensive. An alternate implementation would provide flash storage that satisfies the 2.7 TB/s bandwidth requirement (in addition to 30,000 4 TB drives that provide 2.0 TB/s of bandwidth) and then slowly migrate the data from the flash memory to the disks, in a similar manner to a conventional write-back buffer. This alternate implementation, however, is over-designed since the aggregate bandwidth of the 30,000 4 TB drives and flash storage is 4.7 TB/s.

According to one aspect of the invention, a more efficient checkpoint solution is achieved by employing both the flash storage and the disk storage during the checkpoint operation. For example, flash storage can be employed that provides 0.7 TB/s of bandwidth in addition to 30,000 4 TB drives that provide 2.0 TB/s of bandwidth, thus providing an aggregate bandwidth of 2.7 TB/s. According to a further aspect of the invention, the available bandwidth of the flash storage and the disk storage are employed during a checkpoint operation, and then load rebalancing is employed when one or more storage devices are full.

Figure 1:
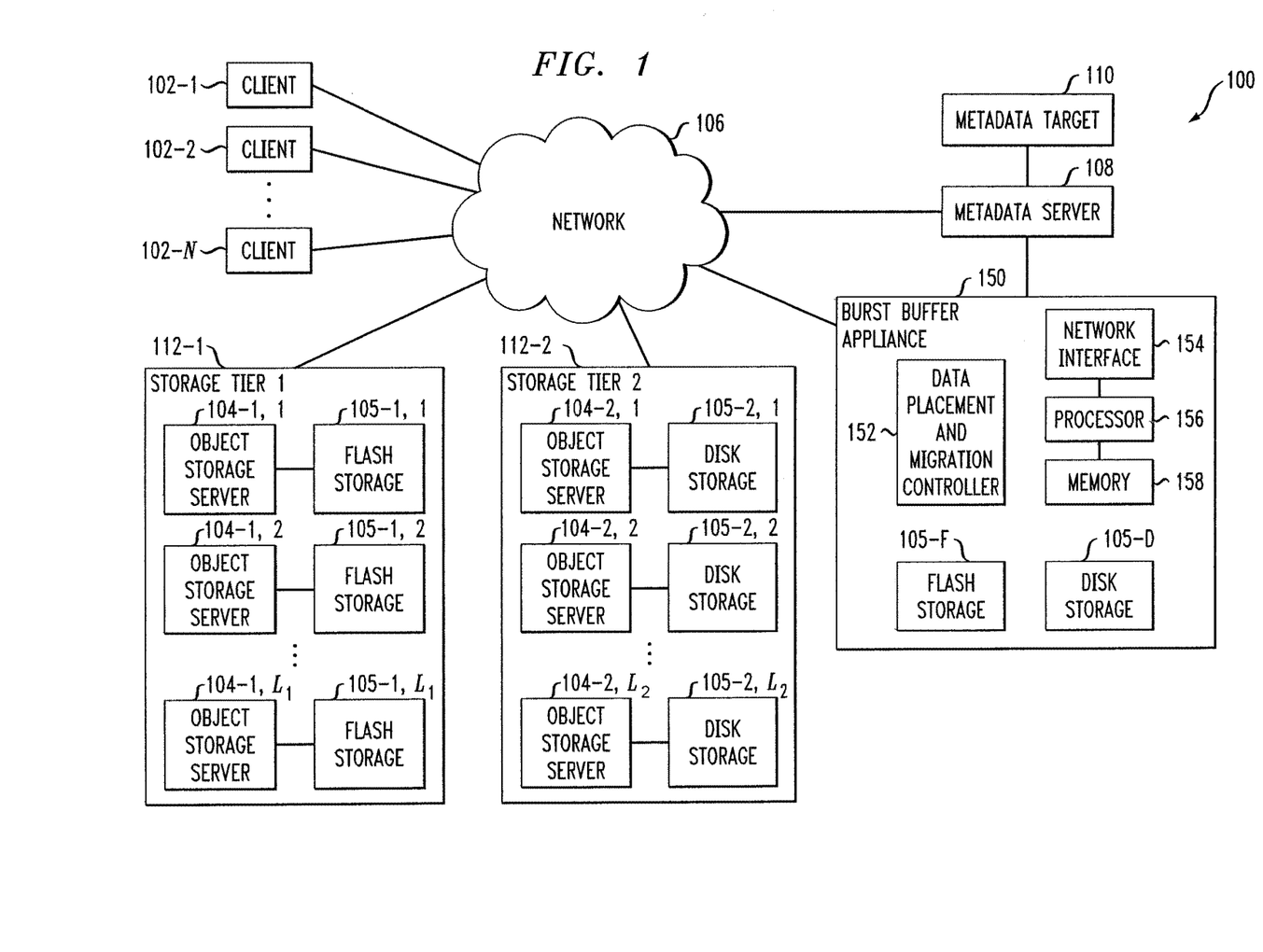
FIG. 1 shows a file system configured in accordance with an illustrative embodiment of the present invention.

FIG. 1 shows a file system 100 configured in accordance with an illustrative embodiment of the present invention. The exemplary cluster file system 100 comprises a plurality of clients 102 and a plurality of object storage servers 104. More particularly, the cluster file system 100 comprises N clients denoted 102-1, 102-2, . . . 102-N, and two groups of object storage servers denoted 104-1,1 through 104-1,$L_1$ and 104-2,1 through 104-2,$L_2$. Each of the object storage servers 104 has a corresponding storage device 105 which may comprise a storage array or other type of storage device. Thus, the object storage servers 104-1,1 through 104-1,$L_1$ and 104-2,1 through 104-2,$L_2$ have associated storage devices 105-1,1 through 105-1,$L_1$ and 105-2,1 through 105-2,$L_2$, respectively. The clients 102 and the object storage servers 104 communicate with one another over a network 106. The storage devices 105 are also referred to herein as object storage targets of their corresponding object storage servers 104.

The cluster file system 100 further comprises a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its metadata target 110 in processing metadata requests received from the clients 102 over the network 106. The metadata target 110 may comprise a storage array or other type of storage device.

Storage arrays utilized in the cluster file system 100 may comprise, for example, storage products such as VNX and Symmetrix VMAX, both commercially available from EMC Corporation of Hopkinton, Mass. A variety of other storage products may be utilized to implement at least a portion of the object storage targets and metadata target of the cluster file system 100. A parallel log structured file system (PLFS) can also be employed, based on, for example, John Bent et al., "PLFS: A Checkpoint Filesystem for Parallel Applications," Int'l Conf. for High Performance Computing, Networking, Storage and Analysis 2009 (SC09) (Nov. 2009), incorporated by reference herein.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 in the present embodiment are arranged into first and second storage tiers 112-1 and 112-2, also denoted as Storage Tier 1 and Storage Tier 2, although it is to be appreciated that more than two storage tiers may be used in other embodiments. As noted above, each of the storage devices 105 may be viewed as being representative of an object storage target of the corresponding one of the object storage servers 104. The first and second storage tiers 112-1 and 112-2 comprise respective disjoint subsets of the object storage servers 104. More particularly, the first storage tier 112-1 comprises object storage servers 104-1,1 through 104-1,$L_1$ and the corresponding storage devices 105-1,1 through 105-1,$L_1$, and the second storage tier 112-2 comprises object storage servers 104-2,1 through 104-2,$L_2$ and the corresponding storage devices 105-2,1 through 105-2,$L_2$.

The client 102 may also be referred to herein as simply a "user" or a compute node. The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

The different storage tiers 112-1 and 112-2 in this embodiment comprise different types of storage devices 105 having different performance characteristics. As mentioned previously, each of the object storage servers 104 is configured to interface with a corresponding object storage target in the form of a storage device 105 which may comprise a storage array. The object storage servers 104-1,1 through 104-1,$L_1$ in the first storage tier 112-1 are configured to interface with object storage targets of a first type and the object storage servers 104-2,1 through 104-2,$L_2$ in the second storage tier 112-2 are configured to interface with object storage targets of a second type different than the first type. More particularly, in the present embodiment, the object storage targets of the first type comprise respective flash storage devices 105-1,1 through 105-1,$L_1$, and the object storage targets of the second type comprise respective disk storage devices 105-2,1 through 105-2,$L_2$.

The flash storage devices of the first storage tier 112-1 are generally significantly faster in terms of read and write access times than the disk storage devices of the second storage tier 112-2. The flash storage devices are therefore considered "fast" devices in this embodiment relative to the "slow" disk storage devices. Accordingly, the cluster file system 100 may be characterized in the present embodiment as having a "fast" storage tier 112-1 and a "slow" storage tier 112-2, where "fast" and "slow" in this context are relative terms and not intended to denote any particular absolute performance level. These storage tiers comprise respective disjoint subsets of the object storage servers 104 and their associated object storage targets 105. However, numerous alternative tiering arrangements may be used, including three or more tiers each providing a different level of performance. The particular storage devices used in a given storage tier may be varied in other embodiments and multiple distinct storage device types may be used within a single storage tier.

Also, although only a single object storage target is associated with each object storage server 104 in the FIG. 1 embodiment, other embodiments may associate multiple object storage targets with each object storage server. An example of an arrangement of the latter type will be described below in conjunction with FIG. 2.

The flash storage devices 105-1,1 through 105-1,$L_1$ may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used to implement at least a portion of the storage devices 105. Examples of alternatives to flash storage devices that may be used as respective object storage targets in other embodiments of the invention include non-volatile memories such as magnetic random access memory (MRAM) and phase change random access memory (PC-RAM).

The flash storage devices of the first storage tier 112-1 generally provide higher performance than the disk storage devices but the disk storage devices of the second storage tier 112-2 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the cluster file system 100, leading to enhanced system performance relative to conventional arrangements, while additionally or alternatively providing an ability to achieve particular levels of performance at lower cost.

The cluster file system 100 optionally further comprises a burst buffer appliance 150 configured to communicate with clients 102, object storage servers 104 and metadata servers 108 over the network 106. The burst buffer appliance 150 in the present embodiment is assumed to comprise a flash memory or other high-speed memory having a substantially lower access time than the storage tiers 112. The burst buffer appliance 150 may optionally comprise an analytics engine, and may include other components.

Although flash memory will often be used for the high-speed memory of the burst buffer appliance 150, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients 102 executing on compute nodes (not shown) and a file system such as storage tiers 112, for storing bursts of data associated with different types of IO operations.

In the FIG. 1 embodiment, storage tiering control functionality is implemented in the burst buffer appliance 150 in a manner that avoids the need for any significant changes to clients 102, object storage servers 104, metadata server 108 or applications running on those devices.

More particularly, in this embodiment of FIG. 1, the burst buffer appliance 150 comprises a data placement and migration controller 152, as well as flash storage 105-F and disk storage 105-D. The data placement and migration controller 152 is configured to implement storage tiering control functionality for the flash storage 105-F and disk storage 105-D on the same node as the burst buffer appliance 150, and/or first and second storage tiers 112-1 and 112-2 associated with other object storage servers 104, which as noted above comprise respective disjoint subsets of the object storage servers 104. As shown in FIG. 1, the burst buffer appliance 150 communicates with the metadata server (MDS) 108, for example, to obtain information about file storage on other OSSs 104 to implement storage tiering control functionality for the first and second storage tiers 112-1 and 112-2 associated with other object storage servers 104.

The burst buffer appliance 150 is thereby configured to control movement of data between the storage devices 105 of the first and second storage tiers 112-1 and 112-2. Examples of such movement will be described below. The data placement and migration controller 152 may be viewed as one possible example of what is more generally referred to herein as a "controller," and numerous alternative controllers having various configurations may be used in a given metadata server in other embodiments.

The burst buffer appliance 150 further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the burst buffer appliance 150 is network interface circuitry 154. The network interface circuitry 154 allows the burst buffer appliance 150 to communicate over the network 106 with the clients 102, object storage servers 104 and metadata servers 108. The network interface circuitry 154 may comprise, for example, one or more conventional transceivers.

The data placement and migration controller 152 of the burst buffer appliance 150 may be implemented at least in part in the form of software that is stored in memory 158 and executed by processor 156.

The burst buffer appliance 150 comprising processor, memory and network interface components as described above is an example of what is more generally referred to herein as a "processing device." Each of the clients 102, object storage servers 104 and metadata servers 108 may similarly be implemented as a processing device comprising processor, memory and network interface components.

Although only a single burst buffer appliance 150 is shown in the FIG. 1 embodiment, a given cluster file system in other embodiments may comprise multiple burst buffer appliances 150.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system. An example of a Lustre file system configured in accordance with an embodiment of the invention will now be described with reference to FIG. 2.

Figure 2:
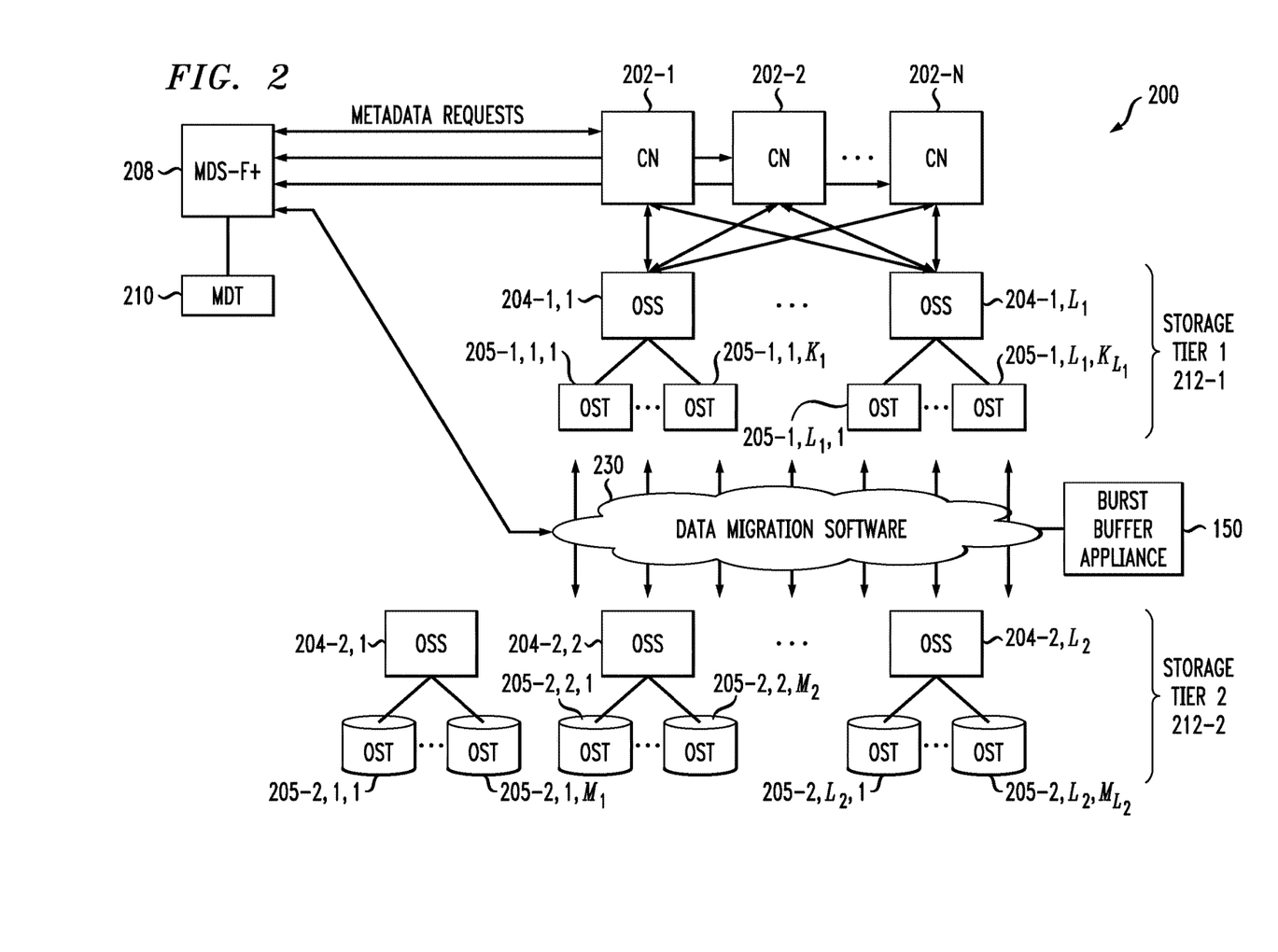
FIG. 2 illustrates an exemplary Lustre file system configured in accordance with an embodiment of the invention.

As illustrated in FIG. 2, a Lustre file system 200 in an embodiment of the invention comprises a plurality of clients 202-1, 202-2, . . . 202-N, a plurality of object storage servers 204, a plurality of object storage targets 205, and a metadata server 208 having a corresponding metadata target 210. The clients 202 are more particularly referred to as compute nodes (CNs) in this embodiment. The object storage servers 204, object storage targets 205, metadata server 208 and metadata target 210 are also denoted in this figure as Lustre OSS, OST, MDS and MDT elements, respectively.

A given OSS 204 exposes multiple OSTs 205 in the present embodiment. Each of the OSTs may comprise one or more storage arrays or other types of storage devices. The total data storage capacity of the Lustre file system 200 is the sum of all the individual data storage capacities represented by the OSTs 205. The clients 202 can concurrently access this collective data storage capacity using data IO requests directed to the OSSs 204 based on metadata obtained from the MDS 208. The IO requests and other similar requests herein may be configured, for example, in accordance with standard portable operating system interface (POSIX) system calls.

The MDS 208 utilizes the MDT 210 to provide metadata services for the Lustre file system 200. The MDT 210 stores file metadata, such as file names, directory structures, and access permissions.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNU/TM-2009/117, April 2010, pp. 1-95, which are incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by configuring the burst buffer appliance 150 of the Lustre file system 200 to incorporate storage tiering control functionality. As will be described, such arrangements advantageously allow for transparent inclusion of a flash storage tier in a cluster file system in a manner that avoids the need for any significant changes to clients, object storage servers, metadata servers or applications running on those devices. Again, other types and configurations of multiple storage tiers and associated storage devices may be used. Also, multiple burst buffers 150 may be implemented in the system in other embodiments.

The particular storage tiering arrangement implemented in Lustre file system 200 includes first and second storage tiers 212-1 and 212-2, with data migration software 230 being utilized to control movement of data between the tiers. Although shown as separate from the burst buffer appliance 150, the data migration software 230 is assumed to be implemented at least in part in a controller of the burst buffer appliance 150, which may be similar to the data placement and migration controller 152 utilized in the FIG. 1 embodiment. As shown in FIG. 2, the data migration software 230 communicates with the metadata server (MDS) 208, for example, to obtain information about file storage on other OSSs to implement storage tiering control functionality for the first and second storage, tiers 112-1 and 112-2 associated with other object storage servers 104 (FIG. 1). Exemplary features of the data migration software and other functionality associated with a controller of a burst buffer appliance 150 will be described below. Other portions of the data migration software 230 are assumed to be implemented in other system components, such as the OSSs of the first and second storage tiers 212-1 and 212-2.

In the first storage tier 212-1, there are $L_1$ OSSs having $K_1, K_2, \ldots K_{L1}$ OSTs, respectively. Thus, for example, OSS 204-1,1 has OSTs denoted 205-1,1,1 through 205-1,1,$K_1$, and OSS 204-1,$L_1$ has OSTs denoted 205-1, $L_1$,1 through 205-1, $L_1$,$K_{L1}$.

In the second storage tier 212-2, there are $L_2$ OSSs having $M_1, M_2, \ldots M_{L2}$ OSTs, respectively. Thus, for example, OSS 204-2,1 has OSTs denoted 205-2,1,1 through 205-2,1, $M_1$, OSS 204-2,2 has OSTs denoted 205-2,2,1 through 205-2,2,$M_2$, and OSS 204-2,$L_2$ has OSTs denoted 205-2, $L_2$,1 through 205-2, $L_2$,$M_{L2}$.

As in the FIG. 1 embodiment, it is assumed that the OSTs of the first storage tier 212-1 are "fast" relative to the "slow" OSTs of the second storage tier 212-2. For example, the OSTs of the first storage tier 212-1 may comprise primarily flash storage devices and the OSTs of the second storage tier 212-2 may comprise primarily disk storage devices. As mentioned previously, the flash storage devices generally provide higher performance than the disk storage devices but the disk storage devices generally provide higher capacity at lower cost than the flash storage devices. Like the FIG. 1 embodiment, the exemplary tiering arrangement of FIG. 2 makes it possible to dynamically balance the conflicting requirements of storage capacity and IO throughput, thereby avoiding situations in which either performance is less than optimal or the costs of implementing the system become excessive. This is achieved in the present embodiment primarily by introduction of the burst buffer appliance 150, and therefore with minimal disruption to other system elements such as clients 102, object storage servers 104, metadata servers 208 or applications running on those devices. The MDS 208 in the FIG. 2 embodiment is also denoted as an MDS-F+ component as it is configured to support a flash extension of the cluster file system 200 using a flash storage tier as previously described.

It should be noted with regard to the illustrative embodiments of FIGS. 1 and 2 that relatively minor modifications may be made to one or more applications or other system elements or components in order to achieve additional improvements. For example, a job scheduler or other similar component within the system 100 or 200 can also be modified so as to take full advantage of the available storage tiering functionality. Also, some relatively minor modifications may be made to at least a portion of the object storage servers 104 or 204. For example, object storage servers of each of the storage tiers 112 or 212 in the system 100 or 200 may be optimized for use with the corresponding storage device type of their corresponding storage tier.

Figure 3:
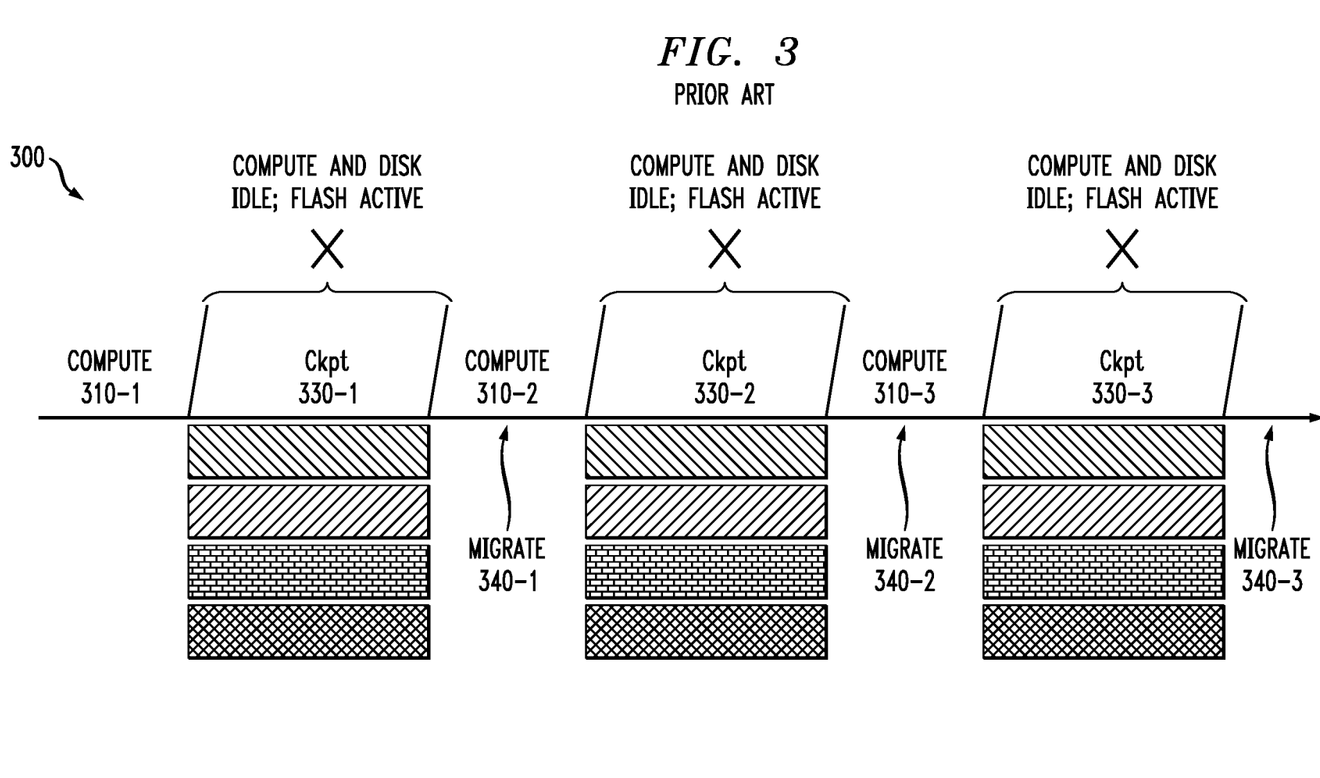
FIG. 3 illustrates a conventional checkpointing process for four exemplary distributed processes.

FIG. 3 illustrates a conventional checkpointing process 300 for four exemplary distributed processes. In a conventional checkpointing process 300, a plurality of distributed processes perform computing operations during a compute phase 310, such as compute phases 310-1 through 310-3. In addition, during the checkpoint operation 330, such as checkpoint operation 330-1, each distributed process then stores its own distributed state as a checkpoint. In FIG. 3, a different hash pattern is employed to indicate the checkpoint for each of four exemplary processes. As shown in FIG. 3, during a checkpoint operation 330, the compute elements on the compute nodes 202 and the disk storage tier 212-2 of the parallel system 200 (FIG. 2) are idle. All checkpoints are stored to the flash storage tier 212-1 of the parallel system 200.

Upon completion of each checkpoint, the checkpoint data is typically migrated to the disk storage tier 212-2, such as migration operation 340-1. It is again noted that the bandwidth of the storage system must be provisioned for all processes to store data during the checkpoint intervals 330 on flash storage tier 212-1.

Figure 4:
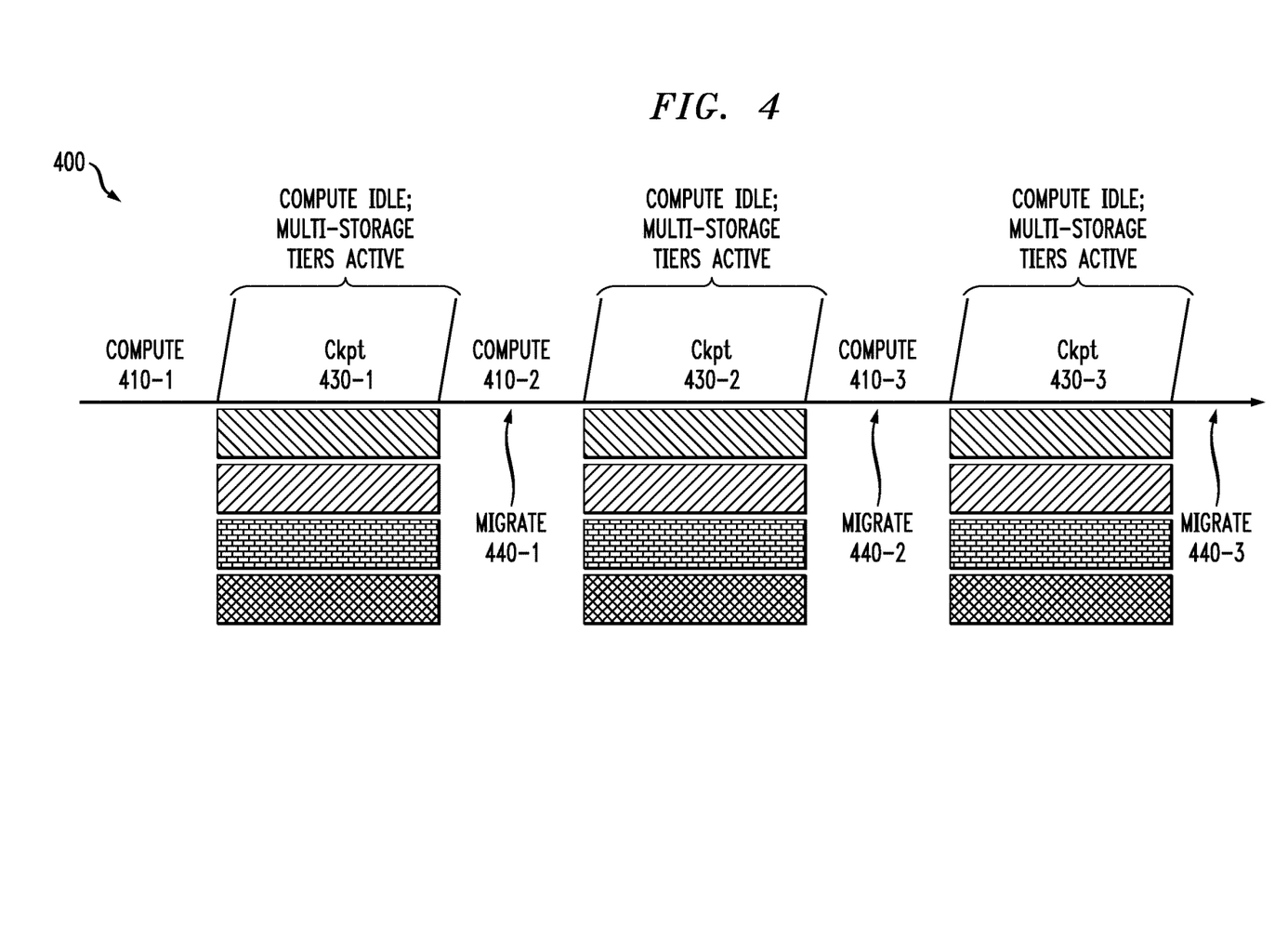
FIG. 4 illustrates a checkpointing process for four exemplary distributed processes in accordance with aspects of the present invention.

FIG. 4 illustrates a checkpointing process 400 for four exemplary distributed processes in accordance with aspects of the present invention. In the exemplary checkpointing process 400, a plurality of distributed processes perform computing operations during a compute phase 410, such as compute phases 410-1 through 410-3. In addition, during the checkpoint operation 430, such as checkpoint operation 430-1, each distributed process then stores its own distributed state as a checkpoint. In FIG. 4, a different hash pattern is employed to indicate the checkpoint for each of four exemplary processes. As shown in FIG. 4, during a checkpoint operation 430, the compute elements on the compute nodes 202 are idle. Each checkpoint is stored to multiple storage tiers, such as the flash storage tier 212-1 and the disk storage tier 212-2 of the parallel system 200 (FIG. 2). Upon completion of each checkpoint, the checkpoint data stored in the flash storage tier 212-1 is migrated to the disk storage tier 212-2, such as migration operation 340-1.

Figure 5A:
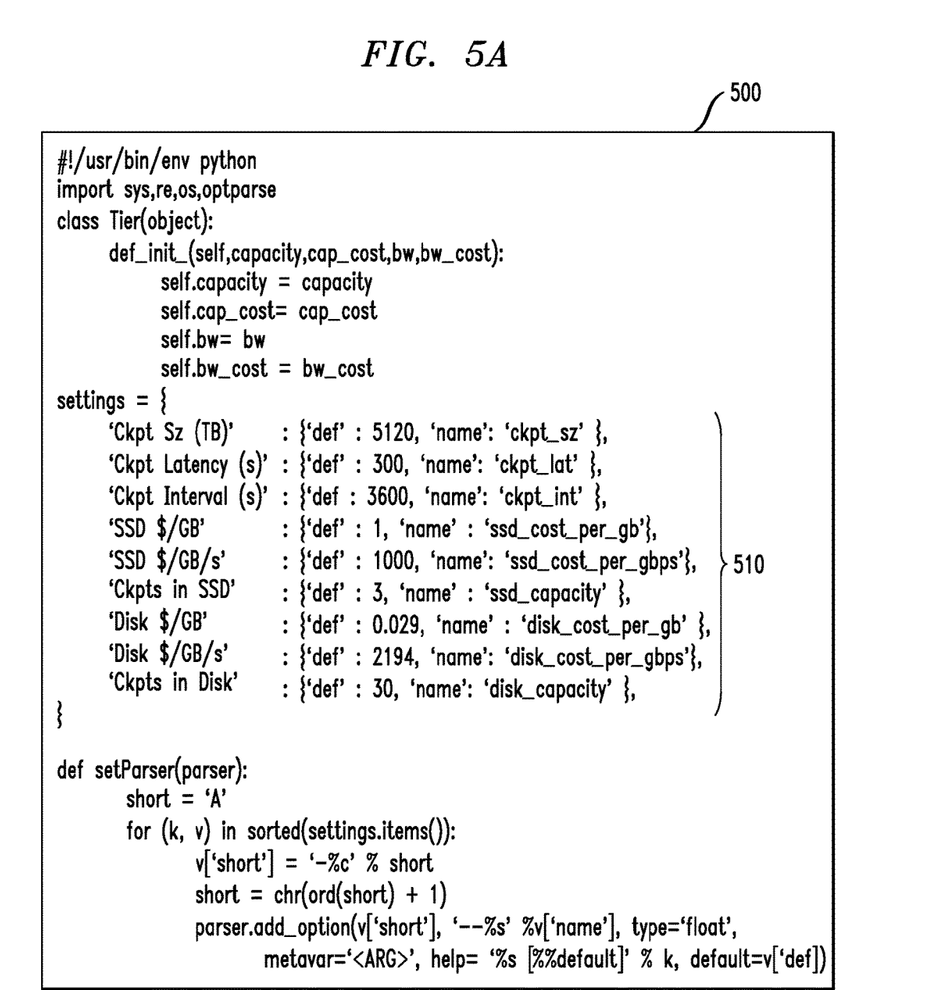
FIGS. 5A through 5D, collectively, illustrate exemplary pseudo code for a provisioning process that determines the amount of storage required for each storage tier of a file system.

FIGS. 5A through 5D, collectively, illustrate exemplary pseudo code 500, 525, 550, 575, respectively, for a provisioning process that determines the amount of storage required for each of the exemplary flash and disk storage tier 212-1, 2 of the file system 100, 200, in order to satisfy the capacity and bandwidth requirements of a given desired implementation. As shown in FIG. 5A, the exemplary pseudo code 500 comprises a settings section 510 to specify, for example, the desired size, latency (duration), interval (frequency) of the checkpoints; the cost-per-Gigabyte, cost-per-bandwidth and number of checkpoints to be stored in the flash storage tier 212-1 (SSD); and the cost-per-Gigabyte, cost-per-bandwidth and number of checkpoints to be stored in the disk storage tier 212-2. For example, the exemplary settings section 510 specifies the storage of 3 checkpoints in the flash storage tier 212-1. In this manner, two checkpoints can be stored for a current distributed application and a third checkpoint can be stored for a next distributed application (restart). The exemplary pseudo code 500 also comprises a section 510 for defining a parser.

Figure 5B:
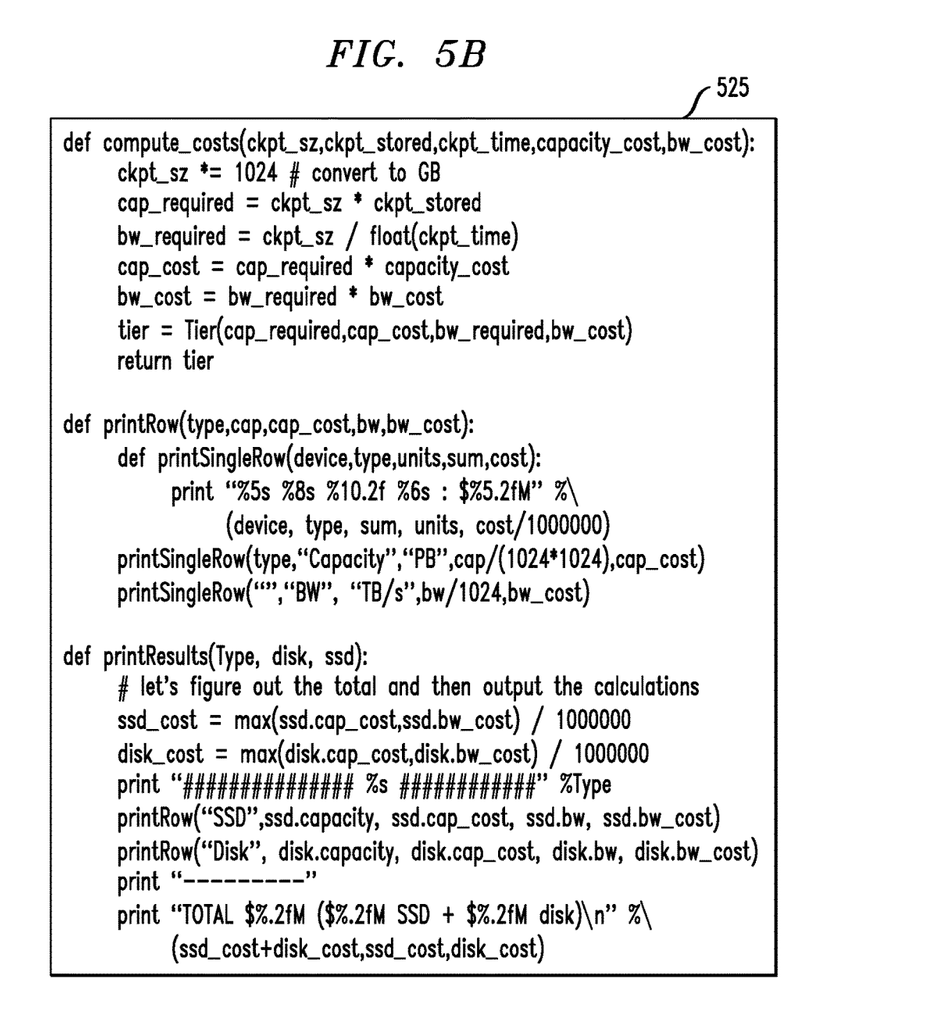
Figure 5C:
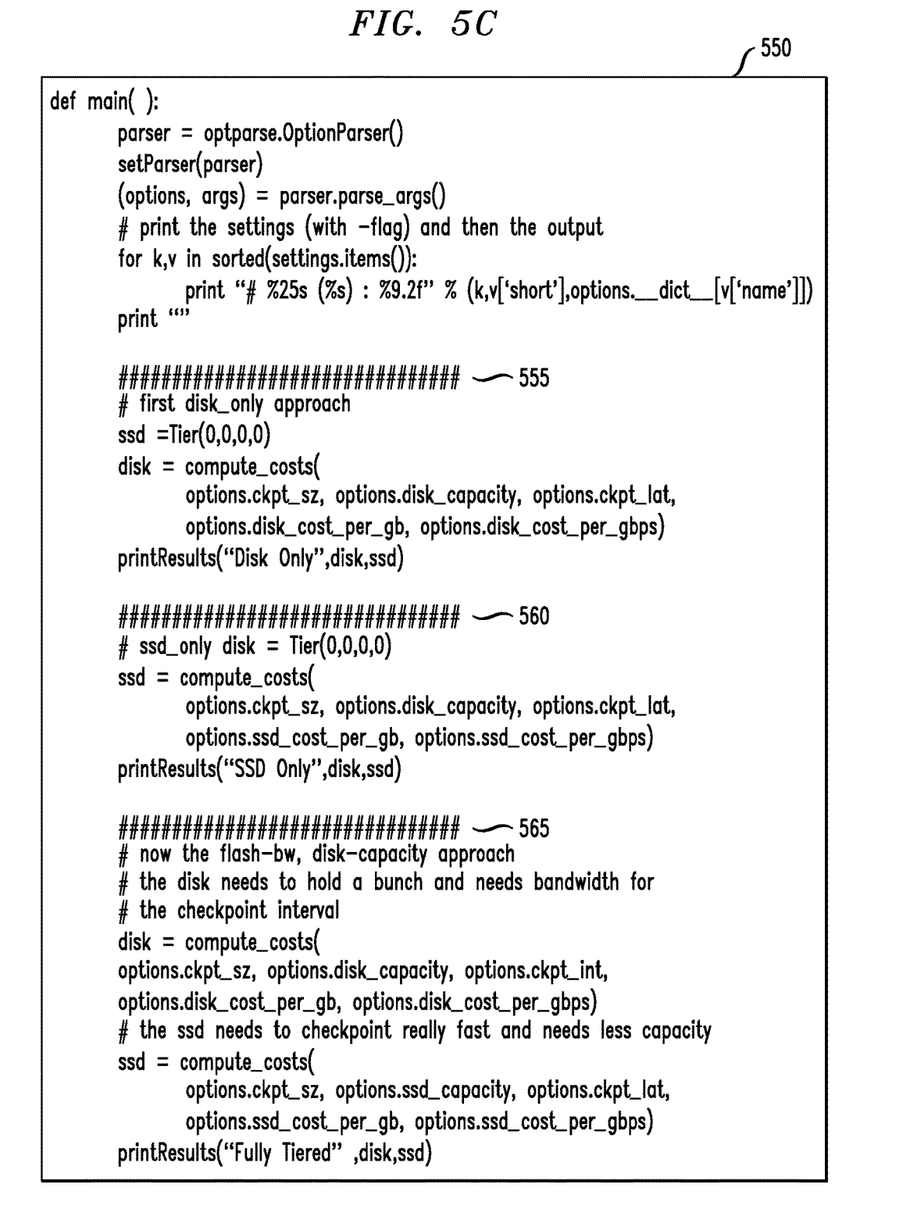
Figure 5D:
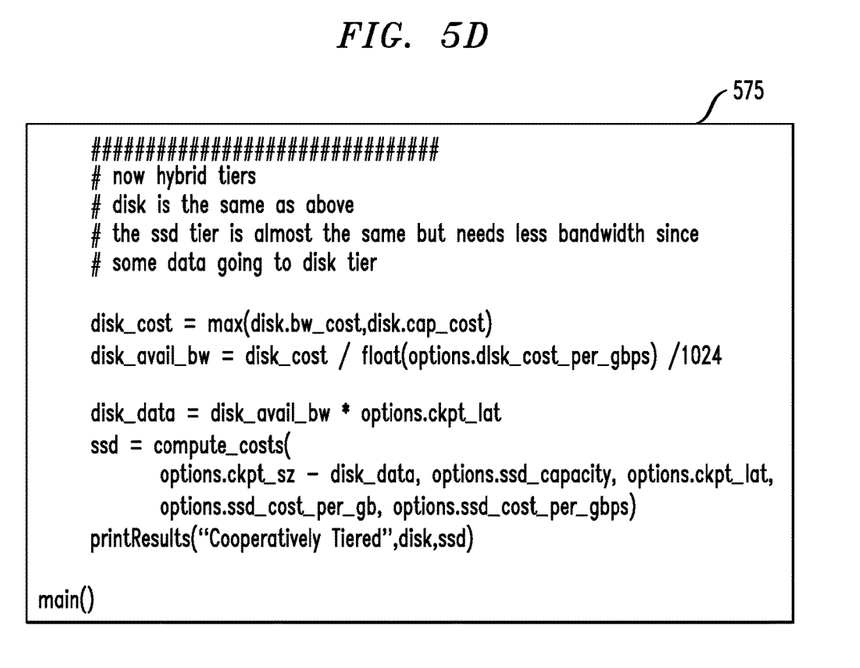

As shown in FIG. 5B, the exemplary pseudo code 525 comprises a section for defining, compute costs, print row and print results subroutines. FIG. 5C illustrates a first portion 550 of the main routine. The exemplary pseudo code 550 of FIG. 5C includes sections 555, 560 and 565 for computing the costs for a disk tier only approach, a flash tier only approach and a flash-bandwidth/disk-capacity approach, respectively. Finally, exemplary pseudo code 575 of FIG. 5D computes the costs for an exemplary hybrid tiered approach.

Figure 6:
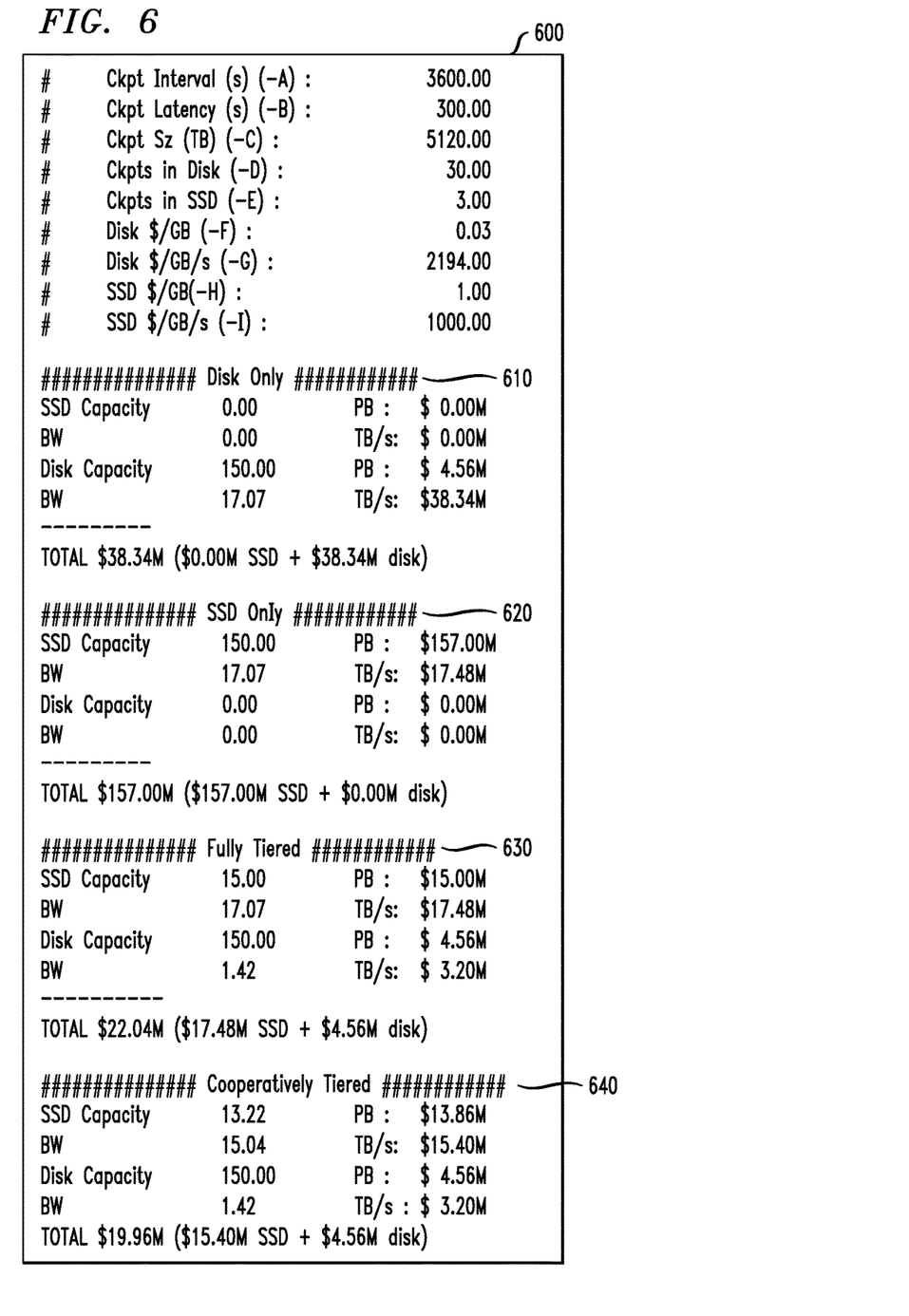
FIG. 6 illustrates an exemplary output from the provisioning process described in conjunction with FIGS. 5A through 5D.

FIG. 6 illustrates an exemplary output 600 from the provisioning process described in conjunction with FIGS. 5A through 5D. The exemplary output 600 indicates the amount of storage required for each of the exemplary flash and disk storage tiers 212-1, 2 of the file system 100, 200, in order to satisfy the capacity and bandwidth requirements for a disk tier only approach 610, a flash tier only approach 520, a fully tiered approach 630 and an exemplary hybrid (cooperatively) tiered approach 640.

It is to be appreciated that the particular operations and associated messaging illustrated in FIGS. 4 and 5A through 5C are exemplary only, and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the parallel file system 100, 200. Such components can communicate with other elements of the parallel file system 100, 200 over any type of network or other communication media.

As indicated previously, components of a multi-tier checkpoint system and a storage tier provisioning system as disclosed herein can be implemented at least in part in the form of one or more software programs stored in memory and executed by a processor of a processing device. A memory having such program code embodied therein is an example of what is more generally referred to herein as a "computer program product."

The file systems 100 and 200 or portions thereof may be implemented using one or more processing platforms each comprising a plurality of processing devices. Each such processing device may comprise processor, memory and network interface components of the type illustrated for burst buffer appliances 150 in FIG. 1.

As indicated above, file system functionality such as that described in conjunction with FIGS. 1, 2, 4 and 5A through 5D can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of parallel computing systems and associated clients, servers and other processing devices that can benefit from the multi-tier checkpointing and storage tier provisioning functionality as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A parallel file system, comprising:
    at least first and second storage tiers comprising respective disjoint subsets of storage; and
    at least one processing device coupled to a memory and configured to store burst data from a plurality of distributed processes for a given burst operation, wherein the given burst operation comprises a multi-phase input/output (IO) task having alternating periods of idle time and bursts of one or more of write activity and storage activity, wherein the given burst operation requires a given bandwidth during said given burst operation, wherein said at least one processing device is further configured to (i) store said burst data on both of said at least first and second storage tiers at substantially the same time during said given burst operation such that a first portion of said burst data for said given burst operation is stored on said at least first storage tier and a second distinct portion of said burst data for said given burst operation is stored on said second storage tier, and (ii) migrate said first portion of said burst data from said at least first storage tier to said at least second storage tier, where said second distinct portion of said burst data is stored, substantially upon completion of said given burst operation, wherein the storage of said burst data on said at least first storage tier and said at least second storage tier, and the migration of said burst data from said at least first storage tier to said at least second storage tier is performed by a burst buffer appliance, and wherein the first portion of said burst data and the second portion of said burst data are dynamically allocated by said at least one processing device.

2. The parallel file system of claim 1 wherein the burst data comprises checkpoint data.

3. The parallel file system of claim 1 wherein the first storage tier comprises non-volatile electronic storage devices including one or more of flash, MRAM and PC-RAM.

4. The parallel file system of claim 1 wherein the second storage tier comprises disk storage devices.

5. The parallel file system of claim 1 wherein the parallel file system comprises a Lustre file system.

6. A method comprising:
    obtaining burst data from a plurality of distributed processes for a given burst operation, wherein the given burst operation comprises a multi-phase input/output (IO) task having alternating periods of idle time and bursts of one or more of write activity and storage activity;
    storing said burst data for a given burst operation requiring a given bandwidth during said given burst operation on at least first and second storage tiers comprising respective disjoint subsets of storage at substantially the same time such that a first portion of said burst data for said given burst operation is stored on said at least first storage tier and a second distinct portion of said burst data for said given burst operation is stored on said second storage tier; and
    migrating said first portion of said burst data from said at least first storage tier to said at least second storage tier, where said second distinct portion of said burst data is stored, substantially upon completion of said given burst operation, wherein the step of storing and migrating are performed by a burst buffer appliance and wherein the first portion of said burst data and the second portion of said burst data are dynamically allocated by at least one processing device.

7. The method of claim 6 wherein the burst data comprises checkpoint data.

8. The method of claim 6 wherein the first storage tier comprises non-volatile electronic storage devices including one or more of flash, MRAM and PC-RAM.

9. The method of claim 6 wherein the second storage tier comprises disk storage devices.

10. A method for provisioning a parallel file system, comprising:

obtaining a specification of burst data requirements for said parallel file system of a given burst operation comprising a multi-phase input/output (IO) task having alternating periods of idle time and bursts of one or more of write activity and storage activity; and determining an amount of storage required for at least first and second storage tiers comprising respective disjoint subsets of storage to satisfy said burst data requirements such that said at least first and second storage tiers can store burst data from a plurality of distributed processes for a given burst operation requiring a given bandwidth during said given burst operation at substantially the same time such that a first portion of said burst data for said given burst operation is stored on said at least first storage tier and a second distinct portion of said burst data for said given burst operation is stored on said second storage tier, wherein said first portion of said burst data is migrated from said at least first storage tier to said at least second storage tier, where said second distinct portion of said burst data is stored, substantially upon completion of said given burst operation, wherein the storage and migration are performed by a burst buffer appliance and wherein the first portion of said burst data and the second portion of said burst data are dynamically allocated by at least one processing device.

11. The method of claim 10 wherein the burst data comprises checkpoint data.

12. The method of claim 10 wherein the first storage tier comprises non-volatile electronic storage devices including one or more of flash, MRAM and PC-RAM.

13. The method of claim 10 wherein the second storage tier comprises disk storage devices.

14. The method of claim 10 further comprising the step of determining an amount of storage required for at least first and second storage tiers comprising respective disjoint subsets of storage to satisfy said migration of the burst data stored on the first storage tier to the second storage tier during a migration phase.

15. A non-transitory machine-readable recordable storage medium, wherein one or more software programs when executed by one or more processing devices implement the steps of the method of claim 6.

16. The parallel file system of claim 1 wherein said at least one processing device is further configured to determine an amount of storage required for at least first and second storage tiers comprising respective disjoint subsets of storage to satisfy said migration of the burst data stored on the first storage tier to the second storage tier during a migration phase.

17. The method of claim 11 wherein said burst data requirements comprise one or more of a desired size, latency and interval of the checkpoints; a cost-per-Gigabyte, cost-per-bandwidth and number of checkpoints to be stored in said first storage tier; and a cost-per-Gigabyte, cost-per-bandwidth and number of checkpoints to be stored in said second storage tier.

18. The method of claim 6 further comprising the step of determining an amount of storage required for at least first and second storage tiers comprising respective disjoint subsets of storage to satisfy said migration of the burst data stored on the first storage tier to the second storage tier during a migration phase.

19. The parallel file system of claim 1 wherein said burst buffer appliance comprises a flash storage device.

* * * * *